United States Patent
Ma

(10) Patent No.: US 7,252,393 B1
(45) Date of Patent: Aug. 7, 2007

(54) TRIANGULAR PRISM DUAL LAMP COUPLER

(75) Inventor: Joseph Ma, Waterloo (CA)

(73) Assignee: Christie Digital Systems Inc., Kitchener (CA)

( * ) Notice: Subject to any disclaimer, the term of this patent is extended or adjusted under 35 U.S.C. 154(b) by 0 days.

(21) Appl. No.: 11/620,616

(22) Filed: Jan. 5, 2007

(51) Int. Cl.
  *G03B 21/14*  (2006.01)
  *F21V 33/00*  (2006.01)

(52) U.S. Cl. .................. 353/94; 362/234; 359/836; 385/901

(58) Field of Classification Search .......... 353/30, 353/94, 98, 99; 362/559, 234, 231, 253; 359/639, 640, 629, 638, 831, 833, 834, 835, 359/836; 385/901, 133
See application file for complete search history.

(56) References Cited

U.S. PATENT DOCUMENTS

| | | | |
|---|---|---|---|
| 5,765,934 A * | 6/1998 | Okamori et al. | 353/94 |
| 6,196,699 B1 | 3/2001 | Stanton | |
| 6,341,876 B1 | 1/2002 | Moss et al. | |
| 6,488,379 B2 | 12/2002 | Kane | |
| 6,527,420 B1 | 3/2003 | Chuang | |
| 6,857,761 B2 | 2/2005 | Chang | |
| 2005/0174658 A1* | 8/2005 | Long et al. | 359/833 |
| 2005/0254018 A1* | 11/2005 | Magarill et al. | 353/94 |
| 2006/0239006 A1* | 10/2006 | Chaves et al. | 362/294 |
| 2006/0285087 A1* | 12/2006 | Huang | 353/94 |

* cited by examiner

*Primary Examiner*—William C. Dowling
(74) *Attorney, Agent, or Firm*—Birch, Stewart, Kolasch & Birch, LLP

(57) ABSTRACT

A dual lamp coupling system is provided using a single equilateral 60 degree triangle prism in front of the integrator rod to homogenize the focused light from two lamps, with increased projection brightness. According to one embodiment, the equilateral 60 degree triangular prism is integrated into the end of the rod.

8 Claims, 2 Drawing Sheets

TRIANGULAR PRISM DUAL LAMP COUPLER

FIELD

The following is directed in general to flat panel display systems, and more particularly to an improved dual lamp coupling for optical integrators used with DMDs and other display related illumination systems.

BACKGROUND

Optical integrator rods are well known components used primarily in illumination systems for electronic projectors. An optical integrator rod is a hollow or solid internally reflective "light pipe" that uses multiple reflections of a focused light source to obtain homogenization of round or irregular patterns of illumination and convert them into a uniform rectangular pattern. This pattern can be imaged onto a panel such as an LCD (Liquid Crystal Display) or DMD (Digital Micromirror Device) by a relay lens system, and then projected to a screen. Thus, the optical integrator rod is used to improve uniformity and efficiently match the aspect ratio of the illumination source to the panel.

There are two basic types of reflective integrators: a "tunnel" type made of four mirrors, and a solid glass integrator or "solid rod integrator". This latter type is more efficient than the former since it works on lossless multiple reflections using TIR (the Total Internal Reflection) of the glass rod.

Traditionally, for a dual lamp projection system separate integrators have been used for each lamp. Light from each lamp is focused orthogonally onto the input face of the associated integrator rod, and collected at the output face thereof for transmission to the relay lens. Examples of prior systems are disclosed in U.S. Pat. No. 6,196,699 (Stanton), U.S. Pat. No. 6,341,876 (Moss et al), U.S. Pat. No. 6,527,420 (Chuang), U.S. Pat. No. 6,857,761 (Chang), U.S. Pat. No. 6,488,379 (Kane).

The inventor has recognized the desirability of replacing separate integrator rods for each lamp with a single rod, in order to benefit from advantages such as simple mounting, simple alignment, less coupling loss, lower cost since there is no need to provide a mirror coating (only AR coating is required), and eliminated risk of high power damage on the mirror coating.

SUMMARY

According to an aspect of this specification, a dual lamp coupling system is provided using a single equilateral 60 degree triangular prism in front of the integrator rod to homogenize the focused light from two lamps and match the aspect ratio of the lamps to an imaging panel. According to one embodiment, the equilateral 60 degree triangular prism is integrated into the end of the rod.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings, in which.

DETAILED DESCRIPTION

Figure 1:
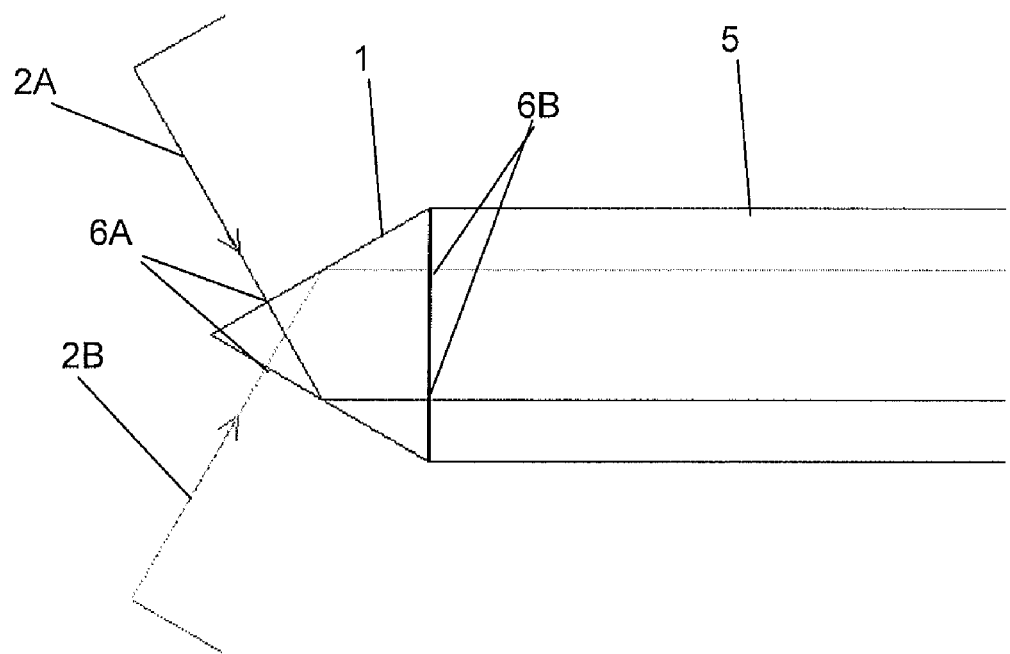
FIG. 1 is schematic representation of a dual lamp coupling for optical integrators, according one embodiment of the invention.
Figure 2:
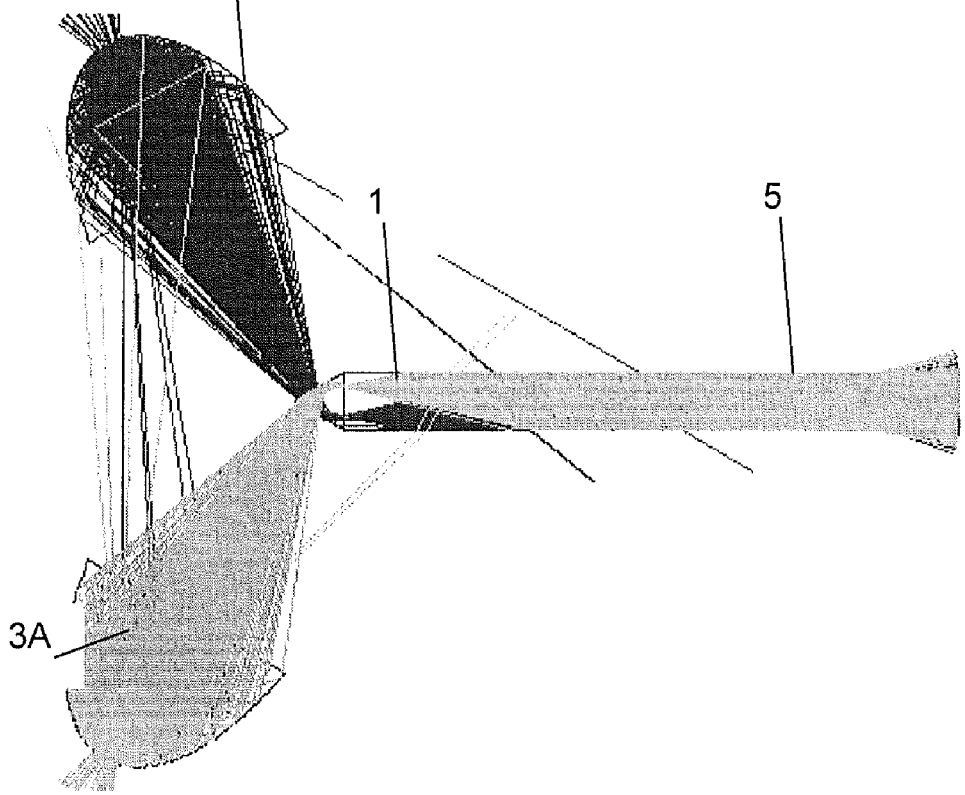
FIG. 2 is a plan view of the dual lamp coupling shown in FIG. 1, depicting the reflection of light rays from dual lamps.

In FIGS. 1 and 2, a 60 degree triangular prism 1 is mounted on its non-illuminated sides so as to couple light rays 2A and 2B from lamps 3A and 3B, respectively, to an integrator rod 5. Due to the geometry of the prism 1, the angle of incidence of the light rays 2A and 2B is perpendicular at the input face 6A and exit face 6B of the prism 1, thereby preserving the F-number of the light source, minimizing light loss due to reflection and maximizing the total cross-sectional area of light collection. In a successful implementation of the invention, the two lamps 3A and 3B were Gen 3 420W Cermax lamps manufactured by Perkin-Elmer, although any appropriately designed lamps may be used.

The light collection efficiency for the arrangement of FIGS. 1 and 2 has been simulated and compared with a single lamp configuration. Specifically, 9998 light rays were launched from a 420 W Gen 3 Cermax lamp and were focused onto the input face of a single 12×9 mm integrator rod (not shown), resulting in a total of 9534 rays being collected at the input rod face (i.e. a 95% collection efficiency). The dual lamp coupling configuration of FIGS. 1 and 2 was then tested by launching 9998×2=19996 rays from a 420 W Gen 3 Cermax lamp and focusing the rays onto the input faces 6A of the prism 1, resulting in a total of 16354 rays being collected at the input rod face 6B (i.e. a 82% collection efficiency). However, the coupling efficiency when compared with the single lamp system=16354/9534=1.715 (~1.72×). Similarly, for a 10×7.5 mm rod 5, the results were 9089 rays collected for the single lamp configuration (i.e. a 91% collection efficiency) versus 15022 rays collected for the dual lamp coupling (i.e. a 75% collection efficiency, but when compared to the single lamp system=15022/9089=1.653 (~1.65×)).

The coupling efficiencies of both dual lamp and single lamp system are tabulated in Table 1.

TABLE 1

|  | Rays Launched | Integrator Input (12 × 9 mm) | Integrator Input (10 × 7.5 mm) |
| --- | --- | --- | --- |
| SINGLE LAMP | 9998 | 9534 | 9089 |
| DUAL LAMP | 19996 | 16354 | 15022 |
| Coupling Efficiency | — | 1.715 | 1.653 |

As can be seen readily from the foregoing, the dual lamp coupling arrangement of the present invention results in better than 50% increase in light collection efficiency at the integrator rod 5 when compared to prior art single lamp configurations.

Figure 3:
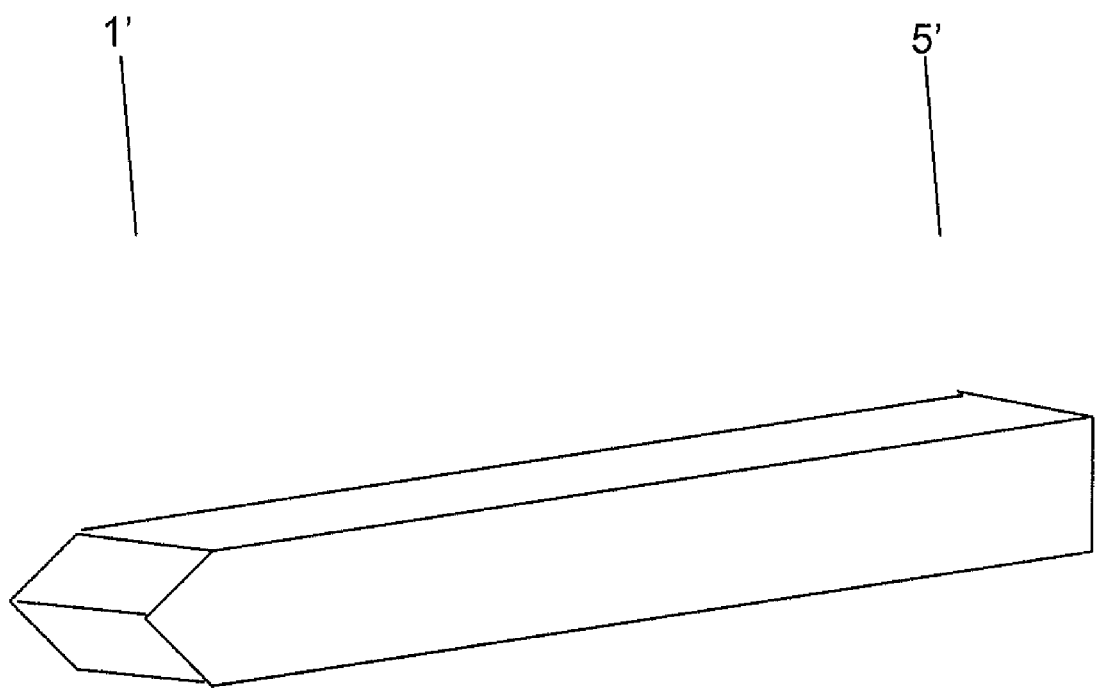
FIG. 3 is a perspective view of a dual lamp coupling according to an alternative embodiment.

A person skilled in the art, having read this description of the preferred embodiment, may conceive of variations and alternative embodiments. For example, as shown in FIG. 3, the 60 degree triangular prism 1' can be integrated into the integrator rod 5' as one single piece. This embodiment has the advantage of reducing reflection loss from the bottom surface of the prism and the front face of the integrator rod 5', although there is less flexibility in terms of the angular orientation of the prism 1' with respect to the integrator rod 5' when compared to the embodiment of FIGS. 1 and 2 (where the integrator rod 5 may be rotated relative to the prism 1). Also, the alternative embodiment may be more costly since the integrated rod and prism require design customization. Also, with appropriate modification of the angle of incidence of light, other internal angles of prism may be used for dual lamp coupling than the equilateral 60 degree triangular prism of the preferred embodiment.

All such variations and alternative embodiments are believed to be within the ambit of the claims appended hereto.

What is claimed is:

1. A dual lamp coupling, comprising:
    a first surface oriented substantially orthogonally to a source of first light rays;
    a second surface oriented substantially orthogonally to a source of second light rays and at a predetermined angle to said first surface whereby said first light rays pass through said first surface and are reflected off of said second surface and said second light rays pass through said second surface and are reflected off of said first surface substantially in parallel with said first light rays reflected off of said second surface; and
    further surfaces oriented substantially parallel to said first and second light rays reflected off of said second and first surfaces, respectively.

2. The dual lamp coupling of claim 1, wherein said first and second surfaces are adjacent surfaces of a prism attached to an optical integrator rod that incorporates said further surfaces.

3. The dual lamp coupling of claim 1, wherein said first and second surfaces are adjacent surfaces integrated into an optical integrator rod that incorporates said further surfaces.

4. The dual lamp of claim 1, wherein said predetermined angle is 60 degrees.

5. The dual lamp of claim 2, wherein said prism is a 60 degree equilateral triangular prism.

6. The dual lamp of claim 3, wherein said predetermined angle is 60 degrees.

7. A dual lamp coupling method, comprising:
    passing first light rays through a first surface oriented substantially orthogonally to said first light rays;
    passing second light rays through a second surface oriented substantially orthogonally to said second light rays and at a predetermined angle to said first surface whereby said first light rays pass through said first surface and are reflected off of said second surface and said second light rays pass through said second surface and are reflected off of said first surface substantially in parallel with said first light rays reflected off of said second surface; and
    reflecting said first and second light rays off of further surfaces oriented substantially parallel to said first and second light rays reflected off of said second and first surfaces, respectively.

8. The method of claim 7, wherein said predetermined angle is 60 degrees.

* * * * *